United States Patent
Lee et al.

(10) Patent No.: US 8,141,136 B2
(45) Date of Patent: Mar. 20, 2012

(54) METHOD AND SYSTEM OF REPLACING SMART CARD

(75) Inventors: Ping Lee, Beijing (CN); Cedric Collomb, Beijing (CN); Hong Wei Cao, Beijing (CN); Xu Wu, Paris (FR); Simon Choi, Singapore (CN); Jian Wu, Shanghai (CN)

(73) Assignee: Gemalto SA, Meudon (FR)

( * ) Notice: Subject to any disclaimer, the term of this patent is extended or adjusted under 35 U.S.C. 154(b) by 1524 days.

(21) Appl. No.: 10/513,933

(22) PCT Filed: May 12, 2003

(86) PCT No.: PCT/CN03/00344
§ 371 (c)(1),
(2), (4) Date: Oct. 16, 2006

(87) PCT Pub. No.: WO03/096723
PCT Pub. Date: Nov. 20, 2003

(65) Prior Publication Data
US 2007/0271603 A1    Nov. 22, 2007

(30) Foreign Application Priority Data
May 10, 2002   (CN) .................. 02 1 17648

(51) Int. Cl.
*G06F 7/04* (2006.01)
*G06F 21/00* (2006.01)
*G08B 29/00* (2006.01)
*H04L 29/06* (2006.01)
*H04L 9/32* (2006.01)
*H04L 9/00* (2006.01)

(52) U.S. Cl. .................. 726/6; 726/9; 726/34; 713/159; 713/165; 713/168; 713/182; 713/185; 380/277; 705/55; 705/56

(58) Field of Classification Search .................. 726/6, 9, 726/34; 713/159, 165, 168, 182, 185; 380/277; 705/55, 56
See application file for complete search history.

(56) References Cited

U.S. PATENT DOCUMENTS
6,505,171 B1 * 1/2003 Cohen et al. ............ 705/26
7,266,371 B1 * 9/2007 Amin et al. ............ 455/419
2002/0029348 A1 * 3/2002 Du et al. ............ 713/193

FOREIGN PATENT DOCUMENTS
WO    WO 97/01253    1/1997
WO    WO 02/13564    2/2002

OTHER PUBLICATIONS
International Search Report (4 pages).

* cited by examiner

*Primary Examiner* — Aravind Moorthy
(74) *Attorney, Agent, or Firm* — Osha • Liang LLP

(57) ABSTRACT

The present invention disclosed a method and system of replacing smart cards. It uses a new identification device (a new SIM) to replace an old one (an old SIM) associated with a user account. The new identification device has an identification number (ICCID). The new identification device is activated in the following manner. The old identification device communicates with an identification-management center through a communication interface (mobile telephone). And the identification-management center recognizes the old identification device. The identification number of the new identification device is sent to the identification-management center through the communication interface. The identification-management center checks the identification number. If the identification number is correct, the user account will be assigned to the new identification device by the identification-management center.

18 Claims, 2 Drawing Sheets

Smart Card Replacement System

METHOD AND SYSTEM OF REPLACING SMART CARD

TECHNICAL DOMAIN

This invention involves a smart card replacement method and system, by which the old smart cards may be conveniently replaced by the new cards with the information transmitted from the old cards, and the users do not have to go to the offices of operators or their agents in person.

BACKGROUND OF THE INVENTION

The last ten years have witnessed the widespread use of IC cards in everyday life in a short span of time. The smart cards are widely used in numerous products, such as mobile phones, credit cards, debit cards, prepaid and postpaid calling cards, ID cards, as well as several industries including communications, tradeoff, and authentication. In fact, the smart card is a microcomputer with CPU (central processing unit) and storage. The difference between smart cards and other cards, such as magnetic stripe cards, mainly lies in security, data storage capacity and verification process. Each smart card has its own ID (identification) and secret key. The ID and secret key are used to identify the card owner, and then for verification, payment, supply, customer transfer, and other services. Because the data is closely guarded by the smart card, the data cannot be duplicated or altered. Some data is exclusively reserved to the card issuer or certain authorized agents with the purpose of setting up the account. Other data, such as the secret key, is not available to anyone, even the card issuer. While this unique feature ensures the security, it is a disadvantage when the card issuer wants to provide new services for the current customers.

In addition, the card issuer wants to replace the old cards held by customers with new ones offering greater calculating power and more storage. This replacement is necessary, firstly because the application and service of smart cards has been gradually improved through technical progress; secondly, the software and hardware of smart cards must be updated to prevent new attack and fraud.

In the field of mobile communication, smart cards must be replaced when operators try to provide more value-added service. But compared with the banking system, no suitable method for replacing smart cards has been available until now, which is inconvenient for people. To avoid the holders of smart cards having to provide information such as subscriber name and address, many countries rule that the holders of the smart cards for mobile phones may remain anonymous. In the current practical application, the subscribers must go to the offices of the mobile operators or their agents when they want to replace the SIM (Subscriber Identification Module) cards they hold and complete various forms, before the cards are replaced manually. A bottleneck is created due to the large number of subscribers and the limited number of agents, resulting in inconvenience for the subscribers and reduced efficiency for the operators.

SUMMARY OF THE INVENTION

Due to the above-mentioned factors, this invention has been accomplished. The aim of this invention is to offer a method and system to simplify the process for replacing smart cards of users and operators.

In order to achieve the above aim, on the one hand, this invention shall provide the smart card replacement method, which includes the following steps: a) to provide a new inactivated smart card with the new ICCID (smart card identification); b) to ensure an old smart cart to be replaced has the old ICCID number and the information of user identification on it, which have been registered and activated, also corresponding to the relevant user account; c) to build the communication channel for data transmission between the user and the operator system; d) the operator system shall extract the user identification information from said old smart card and define the relevant user account according to the user identification information; e) to transmit the ICCID number of the new smart card from the user to the operator system; and f) to associate the ICCID number of the new smart card with the identified user account in the operator system, then to register and activate the new smart card, finally to replace the old smart card.

In order to ensure the successful replacement, this smart card replacement method may also involve the following procedures, g) Within a given time, such as 10 minutes, the new smart card user can make a communication test between the new smart card and the operator's smart card replacement system, and h) if the smart card replacement system does not receive the test response from the user within the predetermined time, the system will confirm the failure of the replacement and switch to the old smart card, at the same time the old user identification number and the old secret key for the old user account would resume their validity. The user must then repeat the above procedures till the replacement is completed correctly.

On the other hand, this invention shall provide the smart card replacement system, which is used to replace the old smart card of the old ICCID number, the old user identification number, and the old secret key with the new smart card with new ICCID, which is stored in database of the operator system but not activated; the old user identification number and old secret key have been registered and activated in the operator system, corresponding to the relevant user account. The system shall involve: the communication devices used to build the data transmission connection between the user end and the smart card replacement system; the user data receiving device, to receive the user's old ICCID number and the old user identification number of the old smart card, and the new ICCID of the new smart card input by the user; the user account identification device used to identify the user account in accordance with the received information including the old ICCID number and old user identification number of the old smart card of the user; and the activation device for the new smart card, used to associate the ICCID number of the new smart card with the identified user account, then to register and activate the new smart card, finally the old smart card will be replaced.

The above-mentioned smart card replacement system shall also involve the notification transmission unit, used to send the notification to the user according to the activation results of the activation device for the smart card; and the test treatment device, used to make the communication test with the new smart card, and if the system of replacing smart card does not receive any test response from the user within the predetermined time, the system would confirm the failure of the replacement and switch to the old smart card, and the old user identification number and old secret key for the user account shall resume its validity.

In the above-mentioned replacing method and system for the smart cards, the smart cards shall be the SIM cards used in mobile phones or the bank cards used in the bank system.

With the smart card replacement method and system involved in this invention, the user can replace the old smart card conveniently with the new smart card with the information transmitted from the old smart card, without having to go to the offices of the operators or their agents in person. This invention shall remove the bottleneck due to the large number of users and the limited number of agents in replacing the smart card, thus improving the operator's efficiency.

BRIEF DESCRIPTION OF THE DRAWINGS

It will be easier to understand this invention with the help of the detailed illustration on the attached figures.

SPECIFIC PROCEDURES USED TO UPDATE THE SMART CARD REPLACEMENT SYSTEM

The smart card replacement method and system involved in this invention shall be illustrated with the practical examples of GSM cards and SIM cards.

Each SIM card has its ICCID, and all the information for the user account is stored in the SIM card while the fundamental data used in the mobile phone system of current GSM standards must be included, of which the most important data is the IMSI (International Mobile Subscriber Identity) and Ki (secret key for verification). IMSI is the account ID, and the Ki is used for the communication between the mobile station (phone) and the base station. The IMSI and Ki shall not be used until they are registered in the operator system; otherwise the SIM card cannot be identified. When the old SIM card is replaced by the new SIM card, the two data items must be rebuilt by the system.

The most important step in replacing SIM card is to associate the IMSI and Ki in the new card with the user account, then to activate the new SIM card and replace the old SIM card, finally the new SIM card shall be valid and used by the user to have the communication as usual. The whole replacing process shall be divided into two phases, that is, to prepare the new SIM card and to activate the new SIM card. The two phases will be illustrated in details with the attached figures.

When replacing the new SIM card, the new SIM card shall be available at first.

The new smart card used to replace shall be formatted in advance. In other words, the new smart card for replacement has been programmed according to GSM standards, and the new IMSI and Ki relevant to the SIM card have been recorded in it, so that the SIM card will be put into use once the IMSI and Ki are registered and activated by the operator system. It is typical of most SIM cards currently on the market. If the operator has no particular requirements, the IMSI and Ki originally input into the new smart cards shall be used and activated.

Frequently, however, the new SIM card must be modified. These modifications shall include but not be limited to writing data according to the operator's requirements, such as IMSI, and the data transmitted from the old SIM card to the new one. For example, for the sake of convenience, the user may hope to be able keep the telephone number book, short message, and/or some applications. The above procedures may be materialized with the PB (processing box) designed especially to do this.

Figure 1:
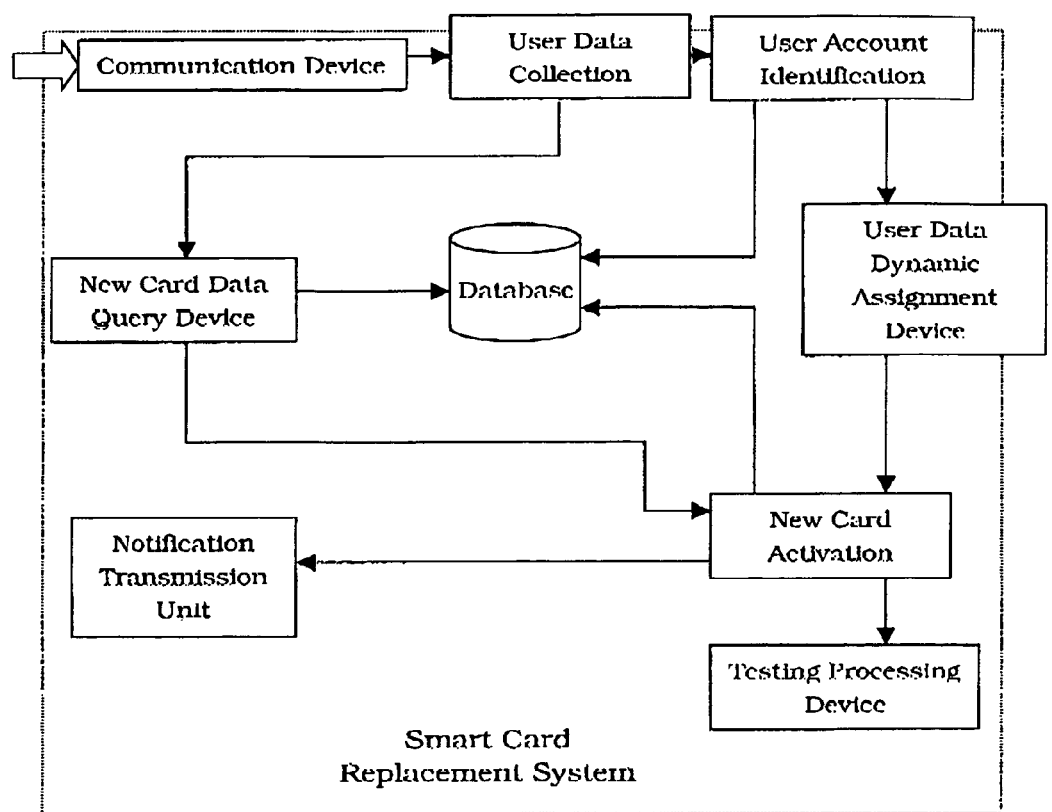
FIG. 1 shows the structure block diagram according to the smart card replacement system involved in this invention.

As illustrated in FIG. 1, the device of PB shall include: one or two card readers used to read the data from the old SIM card and write the data into the new SIM card; CPU, used to control the operation of the whole device of PB; the monitor used to display commands from CPU and the data input by users; input unit, such as keyboard, used to input or confirm data such as the PIN (Personal Identify Number); storage used to hold the data read by the storage card reader, the data written into the new SIM card, and the applications executed by the CPU.

In addition, in accordance with the operator's requirements, the PB may also include the communication unit, which communicates with the operator's smart card replacement system via the Internet, modem, and public switched telephone network or wireless telephone, and the user identification number and secret key for the new smart card shall be acquired from the replacement system.

Moreover the CPU and storage of PB shall be achieved through the large-capacity SIM card. The CPU shall execute the applications stored in the storage and copy the telephone number book, short message, personalized menu configuration, and so on from the old card to the new card, at the same time, write the IMSI and/or Ki for the new card into the new card. If the communication is made with the operator system through the communication unit, PB can also be used to activate the new card.

When the PB is used to operate in the new SIM card, the user shall first insert the old card into the card reader, and then the PB shall copy the data from the old card to its storage, at the same time it will send its command to the user through the monitor, prompting the user to insert the new card. After confirming the insertion of the new card, the PB shall transmit the data from the old card, stored in the storage, to the new card. In order to avert fraud, the PIN shall be input and then the above operation can start. If the PB is equipped with two card readers, the user shall insert the old card and the new card respectively into two card readers, which simplifies the operation.

As has been mentioned before, IMSI and Ki form two key data items for SIM cards. Once loaded, Ki is restrained from being read. Therefore, it is impossible for the Ki to be copied from the old card to the new card in the normal case. The Ki in the new card shall be exclusively preloaded, or assigned dynamically by the operator system via modem, PSTN, or wireless telephone. Instead, IMSI may be read from the old card and copied to the new card. The IMSI is a restricted resource for the operator. Not all the IMSI numbers are available in the designated area. A particular IMSI shall pertain to a HLR (Home Location Register). If IMSI does not match HLR, the card replacement operation will fail.

Considering the above factors, this invention shall provide three IMSI processing methods, each with its own advantages and disadvantages illustrated as follows. The mobile phone operators shall choose one of them according to their requirements and preferences.

TABLE 1

| No. | Approaches | Advantages | Disadvantages |
| --- | --- | --- | --- |
| 1 | To use the preloaded IMSI. | Simple, PB is not necessary. | The new card must be precisely matched to HLR. The telephone book and short messages need to be input through telephone. |
| 2 | To use the IMSI in the old SIM card. | The IMSI resources shall be saved. Since the IMSI of the old card has been used, and it is open to the background system, the redundant stored cards in other areas may be used. | The PB is necessary. |

TABLE 1-continued

| No. | Approaches | Advantages | Disadvantages |
|---|---|---|---|
| 3 | To assign the IMSI dynamically. | The operator shall have the exclusive control over the IMSI resources, and shall rewrite the Ki (although it is not recommended). The redundant stored cards in other areas may be used. The new card may be activated online. | The cost is relatively higher. The PB is required, which can be connected with the operator system online. |

In the first situation, the IMSI and Ki of all the new cards with preloaded information have been stored in the database of the operator system, and the information may be found out easily according to the ICCID of these cards. Both in the second and third situation, IMSI is from the old card, or dynamically assigned. But whatever happens, IMSI and Ki of the specific new cards are known to the operator system after the new cards have been prepared. The new cards having been prepared according to the above requirements are those to be activated.

The activation of the new cards shall be carried out as follows. Firstly, an illustration is made about the smart card replacement system to activate the smart card with the help of FIG. 1.

As illustrated in the lower part of FIG. 1, the smart card replacement system shall include: the database, used to store the new ICCID, the old ICCID corresponding to the user account, and the old IMSI and Ki; the communication device, used to build the data transmission connection between the user end and the smart card replacement system; the user data receiving device, used to receive the information from the user including the old ICCID number and old IMSI of the old card, also receive the new ICCID for the new SIM card input by the user; the user account identification device, used to identify the user account in accordance with the old ICCID number and old IMSI for the old SIM card for the user; and the new card activation device, used to associate the ICCID number of the new SIM card with the identified user account, and then register and activate the new SIM card, so that the old SIM card can be replaced.

According to one practical example of this invention, if the operator chooses the above first situation, the new SIM card has the new ICCID, new IMSI, new Ki, and new ICCID, new IMSI, and new Ki will be stored in the database of the operator system correspondingly, but they have not been activated; the old SIM card has the old ICCID number, old IMSI, and old Ki, which have been registered and activated, and mapped to the relevant user account; and the user account shall transmit the old ICCID number and old IMSI of the old SIM card and the ICCID of the new SIM card to the operator system. The smart card replacement system shall also include the new card data query device, used to find the mapping new IMSI and Ki in the operator system database according to the ICCID of the new SIM card input by the user. At the same time, this new card activation device shall create a new parallel file with these new IMSI and Ki in this user account, which shall validate the new IMSI and Ki and invalidate the old IMSI and old Ki of the user account.

According to the other practical example of this invention, if the operator chooses the second situation above, the new SIM card has the new ICCID and new Ki, and the new ICCID and the new Ki have been stored in the database of the operator system correspondingly, but they have not been activated; the old SIM card has the old ICCID number, old IMSI, and old Ki, which have been registered and activated, and mapped to the relevant user account; and the user account shall transmit the old ICCID number and old IMSI of the old SIM card and the ICCID of the new SIM card to the operator system. Before the new card is activated, the IMSI in the old card must be copied to the new card with the PB, and the smart card replacement system also includes the new card data query device, used to find the associated new Ki in the operator system database according to the ICCID of the new SIM card input by the users. At the same time, the new card activation device shall create a new parallel file in the user account with the old IMSI in the old SIM card and the new Ki found by the new card data query device, which will validate the new IMSI and Ki and invalidate the old IMSI and old Ki of the user account.

Another practical example of this invention shows, if the operator chooses the third situation above, that the new card has the new ICCID and this new ICCID has been stored in the database of the operator system, but it has not been activated; the old SIM card has the old ICCID number, old IMSI, and old Ki, which have been registered and activated, and mapped to the relevant user account; and the user account shall transmit the old ICCID number and the old IMSI of the old SIM card and the ICCID of the new SIM card to the operator system; in addition, the smart card replacement system shall also include the user data dynamic assignment device, used to receive the new IMSI and new Ki dynamically assigned for the new SIM card, and store the new IMSI and new Ki correlated to its ICCID into the database; the new card activation device shall create a new parallel file in the user account with the new IMSI and new Ki, which shall make the new IMSI and new Ki valid and make old IMSI and old Ki of the user account invalid; and the communication device, used to send the new IMSI and new Ki to the new SIM card through the online connection.

In the third situation, the new SIM card can have the new Ki. In this situation, the new ICCID and the new Ki have been correlated and stored in the database of the operator system, but they have not been activated; the user data dynamic assignment device shall exclusively assign the new IMSI for the new SIM card; and the smart card replacement system shall also include the new card data query device, used to search the associated new Ki in the operator system database according to the ICCID of the new SIM card input by the user.

According to another practical example of this invention, the smart card replacement system shall also include the notification transmission unit, used to send the notification to the user according to the activation results of the new card activation device; and the test treatment device, used to make the communication test with the new SIM card; if the smart card replacement system does not receive the test message from the user within the predetermined time, the system shall confirm the failure of the card replacement and switch to the old SIM card, and the old IMSI and old Ki of the user account shall resume their validity.

The above introduces the configuration for the smart card replacement system based on this invention in various situations. The smart card replacement method of this invention shall be introduced in various situations illustrated in the flow chart of FIG. 2.

Figure 2:
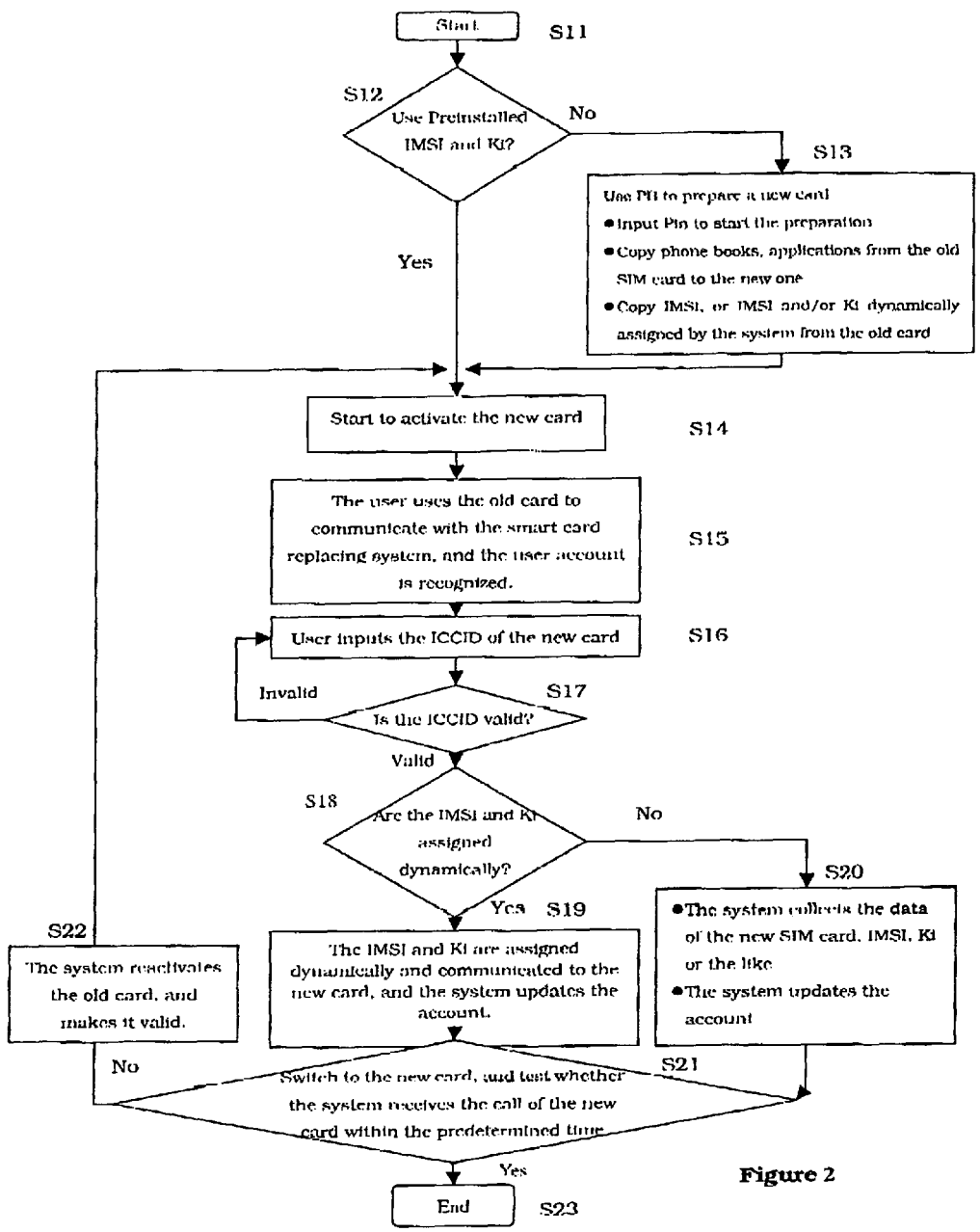
FIG. 2 is the flow chart for the smart card replacement method and system involved in this invention.

As illustrated in FIG. 2, replacing the SIM card shall begin at step S11. Whether to use the preloaded IMSI and Ki or not shall be defined in the step of S12, that is the first situation mentioned above.

If it is defined in the step of S12 that the preloaded IMSI and Ki are not necessary, the new card shall be prepared through the PB. The user will be required to input the PIN, and insert the old card into the PB, and the telephone book, short messages, and applications in the old card shall be identified and stored in the PB storage unit. If the operator chooses the second above-mentioned approach, the IMSI in the old card must be read. The user shall then be given a prompt to insert the new card into the PB, which shall copy the data read in the old card to the new card. In the second situation, the IMSI in the old card shall also be copied in the new card. And then the operation shall go forward to the step of S14, to start the activation of the new card.

If it is defined in the step of S12 that the preloaded IMSI and Ki shall be used, the operation shall go directly forward to the step of S14, to start the activation of the new card. In this situation, the telephone number book, short messages, applications and etc. in the old card shall be sent to the new SIM card with the user's telephone. In other words the above data in the old card shall be first read and stored in the store device of the telephone and then sent to the new SIM card.

In the step of S15, the user shall call the particular number set by the operator with the old card, and communicate with the operator's smart card replacement system. If the operator chooses the third approach above, the user shall communicate with the operator system through the PB at the same time. The operator system shall receive the ICCID and IMSI of the old SIM card of the user and identify the user account according to the received ICCID and IMSI.

After the user has set up the connection with the operator's smart card replacement system using the old card, and then been identified and accepted by the system, the system shall prompt the user to input the ICCID of the new SIM card awaiting the activation in the step of S16. ICCID is the 20-digit number printed on the card, it is the ID for the IC card, which is exclusively matched to each SIM card in the whole system.

The user shall input the 20-digit ICCID of the new SIM card according to the prompt from the system.

And then in the step of S17, the system shall tell whether the ICCID input by the user is valid or not, that is, to confirm whether it has been recorded in the database. If the system finds that the ICCID does not exist, or is occupied by some activated SIM card, it shall go back to the step of S16 and indicate to the user that the ICCID is invalid, and that the ICCID of the new SIM must be input again.

If the system confirms that the ICCID input by the user is effective in the step of S17, it shall go forward to the step of S18, and judge whether it is suitable for the third situation, in which the SIM card is required to assign the IMSI and Ki dynamically. If the system needs to assign the IMSI and Ki dynamically, it shall go forward to S19. In this step the system shall assign the IMSI and Ki dynamically for the new card, and the assigned IMSI and Ki shall be written into the new card through the communication with the PB. The system shall then create a new parallel file in the user account with the new assigned IMSI and Ki and store the file in its database. At the same time, the system shall inform the user that replacement has been completed and inform the user that the communication test of the new card shall be made with the operator system within the predetermined time; otherwise, the system shall switch back to the old card. After these steps are completed, move forward to S21.

If the operator chooses the first or second approach and the system does not have to assign the IMSI and Ki dynamically, S20 will be reached, where the system searches for the IMSI and Ki of the new card in the database (as in the first situation) according to the ICCID input by the user, or only searches the Ki of the new card and uses the IMSI of the old card (as is the second situation). After the system finds data as important as IMSI and Ki of the new SIM card, the system shall create a new parallel file in the user account with these data and store them in its database. At the same time, the system shall inform the user that the card replacement has been completed, informing the user that a communication test must be carried out with the operation system through the new card within the predetermined time; otherwise, the system shall switch to the old card. After these steps are completed, go forward to S21.

In S21, after the communication with the old card is finished, the system shall switch the old card in the user account to the new card, the former being invalidated and the latter validated. At the same time, the system shall await the communication response from the user through the new card within the predetermined time, such as 10 minutes. If the system has not received the call from the user with the new card within the given time delay, the step shall go forward to S22, and the system shall switch to the old card, which resumes its validity. The user must now repeat the above procedures, that is, communicate with the system using the old card and then input the ICCID of the new SIM card till the replacement succeeds.

In S21, if the system receives the call from the user with the new card within the predetermined time, it shows the replacement is accomplished; the operation shall go forward to S23, and the card replacement is completed.

Additionally, according to another practical example of the invention, the above steps in the smart card replacement method may be realized through sending short messages (SMS) between the user and the system.

In the third situation, it is suggested that the system may not assign the new Ki for the new SIM card dynamically (since the Ki may possibly be wiretapped), in order to ensure the safe and successful operation of all the system.

With the example of the SIM card in the GSM system, the smart card replacement method and system based on this invention have been introduced. The invention is of course not limited to the SIM card described. Those skilled in the art shall easily apply the invention into other various systems with smart cards according to the above-mentioned theory, such as CDMA (Code Division Multiple Access) system, bank card system and other systems which require secure data transmission.

The above introduction accounts for the following features. The new identification device (the new SIM) is used to replace the old identification device (the old SIM). The new identification device has an identification number (ICCID). The new identification device shall be activated in the following way. The old identification device shall set up the communication connection with the identification-administration center through the communication ports (mobile phones). The identification-administration center shall identify the old identification device. The identification number shall be sent to the identification-administration center through the communication ports. The identification-administration center checks the identification number. If the identification number is correct, the identification-administration center shall assign the new identification device to the user account.

Although this invention has been illustrated at length through several optimized practical examples above, they are only used for illustration purposes, and those skilled in the art shall understand that many changes and modification can be made without deviating from the design and scope required by the attached claims.

The invention claimed is:

1. A smart card replacement method wherein said method includes the following steps:
   a) provide a new smart card to be activated with a new ICCID (Smart Card Identification), wherein the new smart card carries the new ICCID, and wherein the new ICCID is stored in a database of the operator system, but not activated;
   b) prepare an old smart card awaiting the replacement, said old smart card having an old ICCID, an old user identification number, and an old secret key, which have been registered and activated in the operator system, and have been mapped to the user account;
   c) establish a communication channel for data transmission between a user and an operator system;
   d) determine a user account in accordance with the old user identification number, wherein the user account corresponds to the user, and wherein the old user identification number is extracted from the old smart card by the operator system;
   e) transmit the new ICCID of the new smart card from the user to the operator system using the communication channel; and
   f) correlate the new ICCID of the new smart card with the user account, then register and activate the new smart card, and finally replace the old smart card,
   wherein step d) involves sending the old ICCID and the old user identification number of the old smart card of the user from a user end to the operator system,
   wherein step e) involves prompting the user to input and to receive the new ICCID of the new smart card transmitted by the user,
   wherein step f) includes:
      f1) the operator system receives the new ICCID of the new smart card input by the user, and dynamically assigns a new user identification number and a new secret key to the new ICCID;
      f2) in the operator system, a new parallel file is created with the new user identification number and the new secret key in the user account, to validate the new user identification number and the new secret key, and to invalidate the old user identification number and the old secret key;
      f3) sending the new user identification number and the new secret key to the new smart card; and
      f4) informing the user that the new smart card has been activated.

2. Smart card replacement method according to claim 1, characterized in that the new smart card has the new ICCID, the new user identification number, and the new secret key; wherein the new ICCID, the new user identification number and the new secret key are stored in a database of the operator system, but not activated; the old smart card has the old ICCID, the old user identification number and an old secret key, which have been registered in the operator system, activated, and mapped to the user account; and step f) further includes f5) the operator system searching for the new user identification number and the new secret key in the database, based on the new ICCID the operator system received.

3. Smart card replacement method according to claim 1, characterized in that the new smart card has the new ICCID and new secret key, and the new ICCID and new secret key are mapped and stored in the operator system, but not activated; wherein the old smart card has the old ICCID, the old user identification number, and the old secret key, which have been registered in the operator system and activated, also correlated to the relevant user account; a step c-), carried out before step c), comprising transmitting the old user identification number of the old smart card to the new smart card; and step f) further includes f5) the operator system searches for the new secret key in the database according to the new ICCID the system received, and the new secret key corresponds to the new ICCID.

4. Smart card replacement method according to claim 3, characterized in that the new smart card is a new SIM card used in a mobile phone, a user end is the user's mobile phone, the new user identification number is an IMSI number, the new secret key is Ki, and the operator system is a mobile phone operator system; wherein in step c), the user sets up the communication channel using one of the following approaches over the mobile phone using the old smart card: to set up a voice over IP connection; to set up a text connection; to send a short message which includes the new ICCID of the new smart card the user input.

5. Smart card replacement method according to claim 1, characterized in that the new smart card has the new secret key, and the new ICCID and new secret key have been mapped and stored in a database of the operator system, but not activated; and wherein in step f1), the operator system exclusively assigns the new user identification number dynamically for the new smart card, and searches for the new key in the database according to the ICCID of the new smart card it has received, and the new key is corresponding to the ICCID; and in step f3), only the new user identification number is sent to the new smart card.

6. Smart card replacement method according to claim 5, characterized in that step f) includes the following steps: f+) if the new ICCID is found unavailable, or it is occupied by an activated smart card in current use, an error prompt is sent to the user, and the step goes back to step e) to prompt the user to input the new ICCID again; further, the step of f++) is included after the user is informed by the operator system that the new smart card of the user has been activated, wherein f++) comprises informing the user that the user must make a communication test with the operator system through the new card within a predetermined time, or otherwise the operator system will switch to the old card.

7. Smart card replacement method according to claim 6, characterized in that the following steps shall be included: g) the user makes the communication test with the operator system through the new smart card within the predetermined time; h) if the smart card replacement system has not received the test response from the user within the predetermined time, the system confirms a replacement failure and switches to the old smart card, and the old user identification number and the old secret key of the user account are validated; and i) the user repeats the above replacement steps until a replacement succeeds.

8. Smart card replacement method according to claim 5, characterized in that the new smart card is a new SIM card of a mobile telephone, the user end is a processing box, the new user identification number is an IMSI number, the new secret key is Ki, and the operator system is a mobile phone operator system; wherein in step c), the user sets up the communication channel through the processing box; the processing box includes one or two card readers, used to read the data from an old SIM card and to write the data into the new SIM card; a CPU, used to control the operation of all the processing box units; a monitor, used to display a command from the CPU and data input by the user; an input unit, used to input or confirm data such as PIN or ICCID; a storage device, used to store data read by the card reader, data to be written into the new SIM card, and applications executed by the CPU; and a communication unit, used to communicate with a smart card replacement system via the Internet, modem, and PSTN or wireless telephones so that the IMSI and Ki of the new smart card shall be obtained from the smart card replacement system.

9. Smart card replacement method according to claim 5, characterized in that the new smart card is a bank card, a user end is either the user's computer online or Point Of Sale (POS), and the operator system is a bank server system; wherein in step c), the user shall set up the communication channel and transmit the data via either POS or Internet.

10. A smart card replacement system to replace an old smart card having an old ICCID, an old user identification number, and an old secret key by a new smart card with a new ICCID, wherein the new ICCID of the new smart card is stored in a database of an operator system, but not activated; wherein the old ICCID, the old user identification number and the old secret key have been registered in the operator system and activated, corresponding to a user account, said smart card replacement system including:
- a communication device, used to set up a data transmission connection between a user and the smart card replacement system, wherein the user transmits the old ICCID and the old user identification number of the old smart card of the user, and the new ICCID of the new smart card to the operator system;
- a user data receiving device, used to receive the old ICCID and the old user identification number of the old smart card of the user, and to receive the new ICCID of the new smart card input by the user;
- a user account identification device, used to identify the user account according to the old ICCID and the old user identification number received by the user data receiving device;
- a new card activation device, used to map the new ICCID of the new smart card with the user account identified by the user account identification device, and to register and activate the new smart card so that the old smart card will be replaced,
- a user identification number and a secret key assigning device, used to assign a new user identification number and a new secret key dynamically for the new smart card received by the user data receiving device, and to store the new user identification number and the new secret key in the database, which correspond to the new ICCID;
- a new card activation device, used to create a new parallel file in the user account with the new user identification number and the new secret key, then to validate the new user identification number and new secret key, and at the same time to invalidate the old user identification number and the old key of the user account; and
- a communication device used to send the new user identification number and new secret key to the new smart card.

11. Smart card replacement system according to claim 10, characterized in that the new smart card has the new user identification number and the new secret key; and the new user identification number and the new secret key are mapped and stored in the operator system, but not activated; the user also transmits the old secret key of the old smart card of the user to the operator system; further, the smart card replacement system also includes a new card data query device, used to search for the new identification number and the new secret key in the database of the operator system according to the new ICCID.

12. Smart card replacement system according to claim 10, characterized in that the new smart card has the new secret key, and the new secret key is mapped and stored in the operator system, but not activated; the user also transmits the new ICCID of the new smart card to the operator system; further, the system also includes a data read and write device, used to transmit the old user identification number of the old smart card from the old smart card to the new smart card; a new card data query device, used to search for the new secret key in the database of the operator system according to the new ICCID of the new smart card; and wherein the new card activation device is also used to create a new parallel file in the user account with the old user identification number of the old smart card and the new secret key found by the new card data query device to validate the new user identification number and the new secret key.

13. Smart card replacement system according to claim 10, characterized in that the new smart card still has the new secret key, and the new ICCID and the new secret key are mapped and stored in the database of the operator system, but not activated; further, the user identification number and secret key assigning device exclusively assign the new user identification number dynamically for the new smart card; the system also includes a new card data query device, used to search for the new secret key in the database according to the new ICCID of the new smart card input by the user.

14. Smart card replacement system according to claim 13, characterized in that the new smart card is a SIM card used in mobile phones, a user end is a processing box, the new user identification number is an IMSI number, the new secret key is Ki, and the operator system is a mobile phone operator system; further, the user sets up the data transmission connection to the operator system with the processing box; the processing box includes one or two card readers, used to read the data from an old SIM card and to write the data into the new SIM card; a CPU, used to control the operation of all the processing box units; a monitor, used to display a command from the CPU and data input by the user; an input unit, used to input or confirm data such as PIN or ICCID; a storage device, used to store data read by the card reader, data to be written into the new SIM card, and applications executed by the CPU; and a communication unit, used to communicate with a smart card replacement system via the Internet, modem, and PSTN or wireless telephones so that the IMSI and Ki of the new smart card is obtained from the replacement system.

15. Smart card replacement system according to claim 10, characterized in that a notification transmission unit is included to send a notification to the user according to activation results of the new card activation device; further, if the new ICCID is found to be unavailable, or is occupied by an activated smart card in current use, an error prompt is sent to the user, prompting the user to input the new ICCID again.

16. Smart card replacement system according to claim 10, characterized in that a test processing device is included to make a communication test with the new smart card; further, if the smart card replacement system has not received a response from the user within a predetermined time, the system confirms a replacement failure and switches to the old smart card, then validates the old user identification number and the old secret key in the user account.

17. Smart card replacement system according to claim 10, characterized in that the new smart card is a SIM card used in mobile phones, a user end is a mobile phone of the user, the new user identification number is an IMSI number, the new secret key is Ki, and the operator system is a mobile phone operator system; further, the user sets up the data transmission connection with the communication device using one of the following approaches over the mobile phone with the old smart card: to set up a voice over IP connection; to set up a text connection; to send a short message which includes the new ICCID of the new smart card input by the user.

18. Smart card replacement system according to claim 10, characterized in that the smart card is a bank card, a user end is the user's computer online, a Point Of Sale (POS), or a common fixed telephone; and the operator system is a bank server system; further, the user sets up the data transmission connection with the communication device and transmit the data via POS, Internet or the telephone.

* * * * *